US006449472B1

(12) United States Patent
Dixit et al.

(10) Patent No.: US 6,449,472 B1
(45) Date of Patent: Sep. 10, 2002

(54) SYSTEM AND METHOD FOR REMOTE CONVENIENCE FUNCTION CONTROL WITH AT-VEHICLE AND REMOTE ASSISTANCE-SUMMONING FUNCTIONS

(75) Inventors: Rahul Dixit; Judy (Jiali) Li, both of Farmington Hills; Michael Scott Ogden, Redford; James W. Hussey, Canton, all of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/305,426

(22) Filed: May 5, 1999

(51) Int. Cl.[7] .................. H04M 11/00; H04B 7/00; H04Q 9/00
(52) U.S. Cl. ................ 455/404; 455/521; 340/5.33; 340/5.72
(58) Field of Search .............. 340/825.19, 426, 340/425.5, 825.69, 825.72, 5.33, 5.72; 455/404, 91, 95, 428, 140

(56) References Cited

U.S. PATENT DOCUMENTS

| | | | | |
|---|---|---|---|---|
| 4,143,368 A | * | 3/1979 | Route et al. ............. | 340/543 |
| 4,606,073 A | | 8/1986 | Moore | |
| 4,809,316 A | | 2/1989 | Namekawa | |
| 4,821,309 A | | 4/1989 | Namekawa | |
| 4,884,060 A | * | 11/1989 | Shapiro .................. | 340/514 |
| 4,887,064 A | | 12/1989 | Drori et al. | |
| 4,905,271 A | | 2/1990 | Namekawa | |
| 4,910,493 A | | 3/1990 | Chambers et al. | |
| 5,144,323 A | | 9/1992 | Yonkers | |
| 5,146,215 A | | 9/1992 | Drori | |
| 5,159,317 A | * | 10/1992 | Brav ..................... | 340/574 |
| 5,223,844 A | | 6/1993 | Mansell et al. | |
| 5,247,564 A | | 9/1993 | Zicker | |
| 5,319,698 A | | 6/1994 | Glidewell et al. | |
| 5,357,560 A | | 10/1994 | Nykerk | |
| 5,513,244 A | | 4/1996 | Joao et al. | |
| 5,515,285 A | | 5/1996 | Garrett, Sr. et al. | |
| 5,555,286 A | | 9/1996 | Tendler | |
| 5,630,206 A | | 5/1997 | Urban et al. | |
| 5,652,564 A | | 7/1997 | Winbush | |
| 5,686,910 A | | 11/1997 | Timm et al. | |
| 5,745,033 A | | 4/1998 | Jenkins, Jr. et al. | |
| 5,774,051 A | * | 6/1998 | Kostusiak ............... | 340/539 |
| 5,808,564 A | * | 9/1998 | Simms et al. ............ | 340/990 |
| 5,872,519 A | * | 2/1999 | Issa et al. ............ | 340/825.01 |
| 6,044,257 A | * | 3/2000 | Boling et al. ............ | 455/404 |
| 6,166,627 A | * | 12/2000 | Reeley .................. | 340/426 |
| 6,278,884 B1 | * | 8/2001 | Kim ..................... | 455/556 |

FOREIGN PATENT DOCUMENTS

EP        0242099 A2    10/1986

* cited by examiner

Primary Examiner—Vivian Chin
Assistant Examiner—Charles N. Appiah
(74) Attorney, Agent, or Firm—Tarolli, Sundheim, Covell, Tummino & Szabo L.L.P.

(57) ABSTRACT

A remote convenience system (10) and an associated function remotely control convenience functions at a vehicle (16). A receiver/controller (14), located at the vehicle (16), receives vehicle remote convenience function request signals (30) that convey remote function request messages and controls vehicle systems (e.g., 48, 50, 52, and 68) to perform the remotely requested vehicle functions. The receiver/controller (14) includes a messaging processing portion (110) for providing a signal (e.g., 128/130) to activate an at-vehicle alarm component (e.g., 50/52) and for providing a signal (132) to activate a remote assistance-summoning component (68). A portable transmitter outputs the remote convenience function request signals (30) to cause remote control performance. The transmitter (12) includes a manually actuatable emergency pushbutton switch (94). The switch (94) is actuatable in a first operation mode (e.g., a single actuation) to cause activation of the at-vehicle alarm component (50/52), and is actuatable in a second, different operation mode (e.g., a plurality of actuations) to cause activation of the remote assistance-summoning component (68).

8 Claims, 3 Drawing Sheets

SYSTEM AND METHOD FOR REMOTE CONVENIENCE FUNCTION CONTROL WITH AT-VEHICLE AND REMOTE ASSISTANCE-SUMMONING FUNCTIONS

FIELD OF THE INVENTION

The present invention relates to remote convenience vehicle systems, and particularly relates to remotely controlled at-vehicle alarm and remote assistance-summoning functions.

BACKGROUND OF THE INVENTION

Remote convenience systems for vehicles are known in the art. Such remote convenience vehicle systems permit remote control of certain functions. Examples of remotely controlled functions including locking and unlocking of one or more vehicle doors. A remote convenience vehicle system that permits remote locking and unlocking functions is commonly referred to as a remote keyless entry system.

Such remote convenience vehicle systems may provide for control of other vehicle functions. For example, a remote vehicle locator function may be provided. The vehicle locator function causes a vehicle horn to emit a horn chirp and/or vehicle headlights to flash "ON". This allows a person to quickly locate their vehicle within a crowded parking lot.

Some functions that are remotely controllable are security features for the vehicle and/or the operator. One example of such a remotely controlled security feature is a vehicle security system. The security system is enabled or disabled via remote control.

Another type of remotely controlled security feature is commonly referred to as a "PANIC" function. Upon activation of the PANIC function, the vehicle lights and horn are activated in a mode to draw attention to the vehicle. Still a different type of remotely controlled security feature is a remote distress signaling function for signaling police or rescue authorities to a vehicle.

SUMMARY OF THE INVENTION

In accordance with one aspect, the present invention provides a remote convenience system for remotely controlling convenience functions at a vehicle. Receiver/controller means, located at the vehicle, receives vehicle remote convenience function request signals that convey remote function request messages and controls vehicle systems to perform the remotely requested vehicle functions. The receiver/controller means includes means for providing a signal to activate an at-vehicle alarm component and means for providing a signal to activate a remote assistance-summoning component. Portable transmitter means outputs remote convenience function request signals to cause remote control performance. The transmitter means includes a manually actuatable emergency switch. The switch is actuatable in a first operation mode to cause activation of the at-vehicle alarm component, and is actuatable in a second, different operation mode to cause activation of the remote assistance-summoning component.

In accordance with another aspect, the present invention provides a remote convenience system. The system includes a vehicle-based receiver means located at the vehicle. The receiver means receives vehicle remote convenience function request signals and conveys remote function request messages for use in controlling vehicle systems to perform the remotely requested vehicle functions. The system includes portable transmitter means for outputting remote convenience function request signals to cause remote control performance. The transmitter means includes a manually actuatable emergency switch. The switch is actuatable in first and second different operation modes to cause output of remote convenience function request signals from the transmitter means. The receiver means includes means for conveying a signal to activate an at-vehicle alarm component in response to the first operation mode of the switch. The receiver means includes means for conveying a signal to activate a remote assistance-summoning component in response to the second operation mode of the switch.

In accordance with another aspect, the present invention provides a method of remotely controlling convenience functions at a vehicle. Remote convenience function request signals are output to cause remote control performance at the vehicle. The remote convenience function request signals are received at the vehicle. Remote function request messages are conveyed for use in controlling vehicle systems to perform the remotely requested vehicle functions. The step of outputting remote convenience function request signals includes manually actuating an emergency switch in a first operation mode to cause output of a remote convenience function request signal conveying an atvehicle alarm request. The step of conveying includes conveying a signal to activate an at-vehicle alarm component in response to the first operation mode of the switch. The step of outputting remote convenience function request signals includes manually actuating the emergency switch in a second, different operation mode to cause output of a remote convenience function request signal conveying a remote assistance-summoning request. The step of conveying includes conveying a signal to activate a remote assistance-summoning component in response to the second operation mode of the switch.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENT

Figure 1:
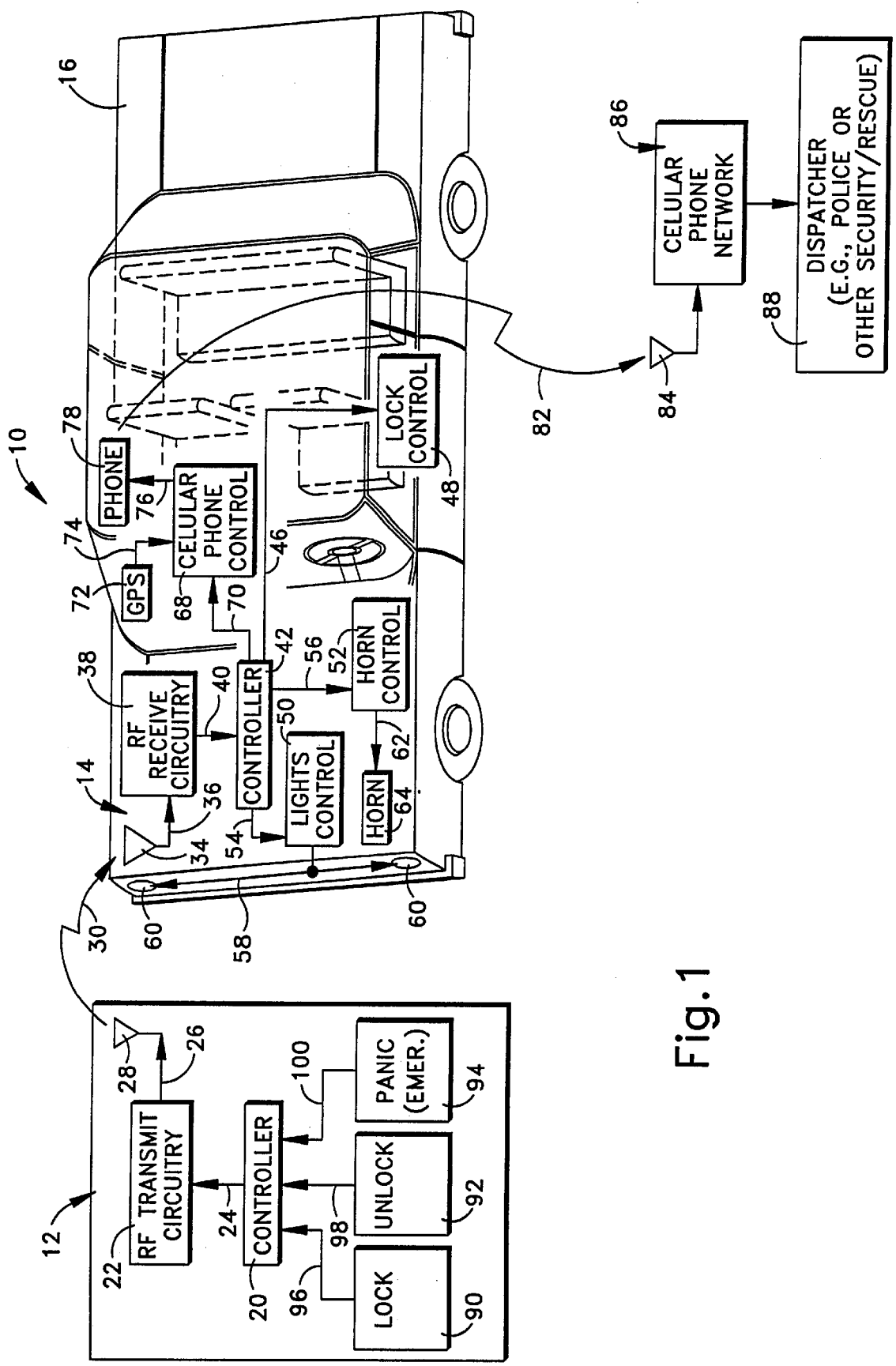
FIG. 1 is a schematic illustration of a remote convenience system, in accordance with the present invention, and an associated vehicle.

One embodiment of a remote convenience system 10, in accordance with the present invention, is schematically shown in FIG. 1. The system 10 includes a portable handheld transmitter unit 12 (hereinafter referred to as "the transmitter 12"), and a vehiclebased receiver/controller unit 14 (hereinafter referred to as "the receiver/controller 14") located at a vehicle 16.

The transmitter 12 is operable by an operator (not shown) to communicate with the receiver/controller 14 from a remote location to achieve remote control performance of at least one convenience function (e.g., unlock doors) at the vehicle 16. In order to accomplish the remote-location communication with the receiver/controller 14, the transmitter 12 includes a controller 20 that generates, assembles a "packet" of information to be transmitted to the receiver/controller 14. The packet typically includes a start/wake-up portion, a security code, and at least one command that represents a remote function request.

RF transmit circuitry 22 is operatively connected 24 to the controller 20 to receive the message packet that is to be transmitted to the receiver/controller 14. The RF transmit circuitry 22 is operatively connected 26 to an antenna 28, and outputs an electrical signal that conveys the message packet to the antenna. In response to the stimulus of the electrical signal, the antenna 28 broadcasts an electromagnetic signal 30 that conveys the message packet. The broadcast signal 30 is intended to be received by the receiver/controller 14.

At the receiver/controller 14, an antenna 34 picks-up the broadcast signal 30. The antenna 34, which is operatively connected 36 to RF receive circuitry 38, outputs an electrical signal that conveys the message packet to the RF receive circuitry. In turn, the RF receive circuitry 38 communicates a message packet, via a connection 40, to a controller 42. As part of the functions performed by the controller 42, the controller determines if the broadcast signal 30 is intended for the associated vehicle (i.e., verification of security code, etc.) and outputs appropriate control commands to vehicle systems.

The vehicle systems that are remotely controlled at the vehicle 16 may include any type of vehicle system. In the illustrated example of FIG. 1, the controller 42 is operatively connected 46 to a lock control 48. The lock control 48 controls lock actuators (not shown) for vehicle doors.

A lights control 50 and a horn control 52 are operatively connected 54, 56 to the controller 42. The lights control 50 is operatively connected 58 to provide electrical energy to vehicle lights 60 (e.g., headlights) to control ON and OFF states of the lights. Similarly, the horn control 52 is connected 62 to energize/de-energize a horn 64 of the vehicle 16. The lights 60 and the horn 64 are operated in a pattern (e.g., ON/OFF) to provide an at-vehicle alarm indication (i.e., a "PANIC" indication).

A cellular telephone control 68 is operatively connected 70 to the controller 42. A global positioning system (GPS) 72 is operatively connected 74 to the cellular phone control 68. Also, the cellular phone control 68 is operatively connected 76 to a cellular telephone 78. The cellular phone control 68 derives vehicle position information from the GPS 72 and generates/provides a help summoning message that contains the vehicle position information that is to be transmitted from the cellular phone 78. Specifically, the assistance-summoning message is a pre-programmed, pre-recorded or the like message stating that there is an emergency situation at the vehicle. The cellular phone 78 is automatically dialed (e.g., emergency number "911") by the cellular phone control 68, and the cellular phone control outputs the help summoning message to the cellular phone.

A broadcast telephone signal 82 is output from the cellular phone 78, and is received at an antenna 84 of a cellular telephone network 86. In turn, the telephone "call" is routed to a dispatcher 88. The dispatcher 88 may be a police dispatcher or some other security/rescue dispatcher.

When the call reaches the dispatcher 88 its automated message, including vehicle position information, is provided to the dispatcher. In response to the call, security/rescue authorities are alerted to a distress condition at the vehicle 16 and the location of the vehicle in distress. Thus, the cellular phone control 68, in connection with the GPS 72 and the cellular phone 78, provide for remote assistance summoning of security/rescue authorities.

Turning to the transmitter 12, the transmitter includes a plurality of manually actuatable pushbutton selector switches 90–94. In the example shown in FIG. 1, there are three pushbutton switches 90–94. The first pushbutton switch 90 is identified by an indicia label "lock". The second pushbutton switch 92 is identified by an indicia label "unlock". The third pushbutton switch 94 is identified by an indicia label "PANIC (EMER.)". It is to be appreciated that the indicia used within the example are chosen merely to aid the operator in identifying and remembering various pushbutton switches. It is to be appreciated that different indicia may be used.

The first and second pushbutton switches 90 and 92 are operatively connected 96, 98 with the controller 20 to provide requests for controlling door locking operation at the vehicle 16. Specifically, actuation of the first pushbutton switch 90 is a request to lock the vehicle doors. Actuation of the second pushbutton switch 92 is a request to unlock at least one vehicle door.

The third pushbutton switch 94 is connected 100 to the controller 20 to provide help/assistance requests (i.e., transmission of a PANIC message). Specifically, the third pushbutton switch 94 is associated with control of the at-vehicle alarm function (i.e., activation of the vehicle lights 60 and the vehicle horn 64), and is also associated with control of the remote assistance-summoning function (i.e., activation of the cellular phone control 68 to convey the message via the cellular phone network 86 to the dispatcher 88).

Control of both the at-vehicle alarm function and the remote assistance-summoning function at the vehicle 16 via the third pushbutton switch 94 is accomplished by actuation of the third pushbutton switch in two different operation modes for the two different remotely controlled functions. Specifically, the third pushbutton switch 94 is actuated in a first operation mode to cause activation of the at-vehicle alarm function (i.e., activation of the lights 60 and horn 64 of the vehicle 16). The third pushbutton switch 94 is actuated in a second, different operation mode to cause activation of the remote assistance-summoning function (i.e., telephoning of the dispatcher 88 via the cellular phone 78).

In the preferred embodiment, the first operation mode of the third pushbutton switch 94 is a single actuation of the third pushbutton switch. The second, different operation mode of the third pushbutton switch is a plurality of actuations of the third pushbutton switch 94 within a predetermined time period. In one example, for the second operation mode the third pushbutton switch 94 is actuated five times, with each actuation coming not more that one second after the previous actuation (i.e., a total five actuations within five seconds). For each actuation of the third pushbutton switch 94, the transmitter 12 outputs the broadcast signal 30 that conveys the PANIC message.

Figure 2:
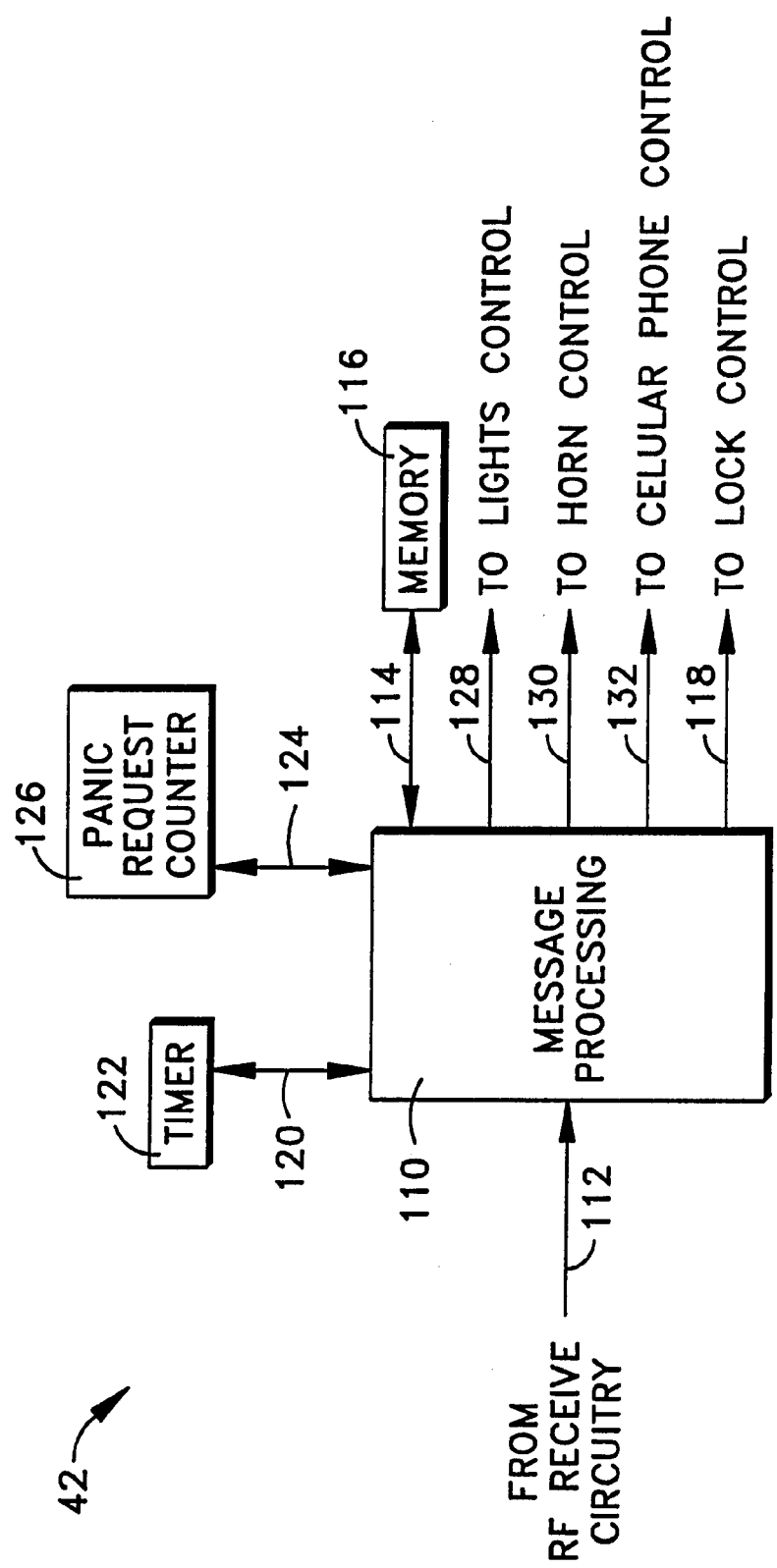
FIG. 2 is a function block diagram of a controller within a vehicle-based receiver of the system of FIG. 1.

At the vehicle 16, the controller 42 determines the remote control function that is being requested. Specifically, within the controller 42, a message processing portion 110 (FIG. 2) receives its input 112 from the RF receive circuitry 38. The message processing portion 110 may be comprised of discrete hardwire circuitry or a processor performing a program. The message processing portion 110 accesses 114 a memory 116 to make a determination regarding whether the received message is intended for the vehicle 16 (i.e., comparison of security code, etc.).

The message processing portion 110 also makes an initial determination as to whether the received signal conveys a lock control request or PANIC function request. If the message is directed to door locking/unlocking, the message processing portion 110 immediately outputs an appropriate signal 118 to the lock control 48. If the message is a PANIC message, the message processing function performs a routine to determine whether the remote function requested is the at-vehicle alarm function or the remote assistancesummoning function.

It is to be recalled that each actuation of the third pushbutton switch 94 at the transmitter 12 causes transmission of the broadcast signal 30 that conveys the PANIC message. Also, it is to recalled that remote assistance summoning is accomplished by timely transmission of a plurality of PANIC messages, which when taken individually would be requests for an atvehicle alarm function. Thus, in order to determine which of the two functions (i.e., either at-vehicle alarm or remote assistance-summoning) is currently being requested, the message processing portion 110 performs a routine.

When a PANIC message is received via broadcast signal 30, the message processing portion 110 communicates 120 with a timer 122 to activate the timer. The message processing portion 110 also communicates 124 with a PANIC request counter 126. The message processing portion 110 utilizes the timer 122 and the PANIC request counter 126 to determine if the predetermined plurality of PANIC messages are received within the predetermined specified time to indicate a remote assistance-summoning request. Depending on whether an at-vehicle alarm function is requested or a remote assistance-summoning function is requested (i.e., single PANIC message or plurality of PANIC messages within specified time parameter), the message processing portion 110 outputs appropriate signals 128, 130 to the light and horn controls 50 and 52, or outputs a signal 132 to the cellular phone control 68.

Figure 3:
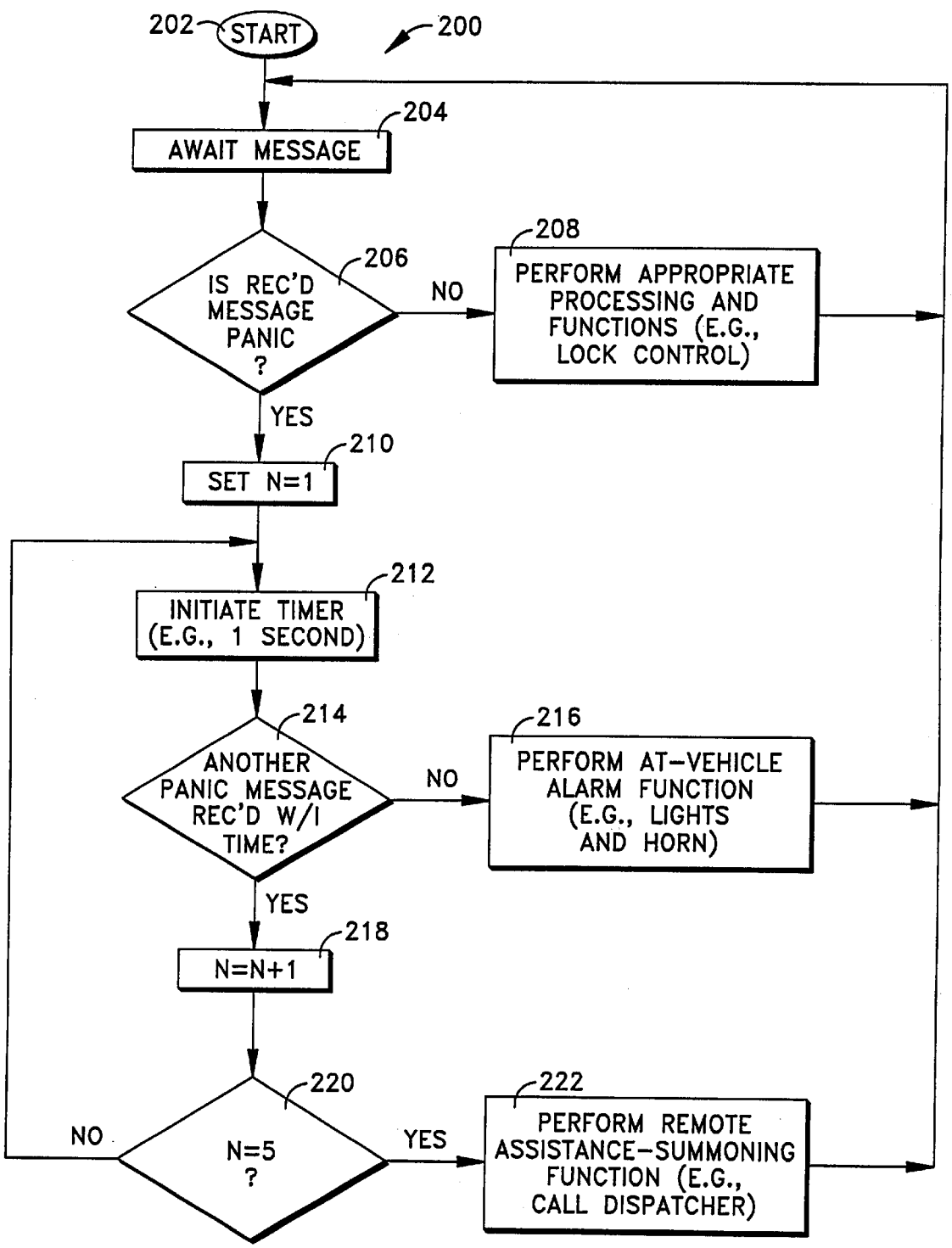
FIG. 3 is a flowchart for a process performed within the controller of the receiver of the system of FIG. 1.

A flowchart for a process 200 performed within the receiver/controller 14 at the vehicle 16 is shown in FIG. 3. The process 200 begins at step 202 and proceeds to step 204. At step 204, the receiver/controller 14 awaits reception of a message via the broadcast signal 30. At step 206, it is determined whether the received message is the PANIC message.

If the determination at step 206 is negative (i.e., the received message is not the PANIC message but is another message, such as unlock), the process 200 goes to step 208. At step 208, appropriate processing and control of function(s) is performed. For example, if the received message is a request to unlock vehicle doors, the message processing portion 110 provides the appropriate signal to the lock control 48. Upon completion of step 208, the process 200 loops back to step 204 to await a next received message.

If the determination at step 206 is affirmative (i.e., the received message is the PANIC message), the process 200 proceeds from step 206 to step 210. At step 210, a variable N is set to 1 (one) within the PANIC request counter 126. At step 212, the timer 122 is initialized (e.g., to time one second). At step 214, it is determined whether another PANIC message is received within the time period being monitored by the timer 122.

If the determination at step 214 is negative (e.g., a subsequent PANIC message was not timely received after the first PANIC message), the process 200 goes to step 216. At step 216, the message processing portion 110 outputs appropriate signals to the lights control 50 and the horn control 52 to provide for the at-vehicle alarm function. Upon completion of step 216 (e.g., flashing of the lights 60 and honking of the horn 64 for a predetermined duration), the process 200 loops from step 216 to step 204, to await a subsequent message.

However, if the determination at step 214 is affirmative (i.e., another PANIC message is received within the time period being monitored by the timer 122), the process 200 proceeds from step 214 to step 218. At step 218, the variable N is increased by one (1) to indicate another timely received PANIC message. At step 220, it is determined whether the variable N has reached the predetermined number to indicate a request for a remote assistance-summoning function. In the disclosed example, the predetermined number is five received PANIC messages.

If the determination at step 220 is negative (i.e., five PANIC messages have not yet been timely received), the process 200 loops from step 220 to step 212. Steps 212 and 214 are again performed in order to determine if a subsequent PANIC message is timely received.

If the determination at step 220 is affirmative (i.e., five PANIC messages have been timely received), the process 200 goes from step 220 to step 222. At step 222, the remote assistance-summoning function is performed. Specifically, the message processing portion 110 provides a signal to activate the cellular phone control 68. The cellular phone control 68 receives location information from the GPS 72 and provides a message to the cellular phone 78 for conveyance to the dispatcher 88 via the cellular phone network 86. Upon completion of step 222, the process 200 loops back to step 204.

From the above description of the invention, those skilled in the art will perceive improvements, changes and modifications. For example, different components can be used to accomplish the at-vehicle alarm and the remote assistance-summoning functions. Examples of such components are a siren and a radio transmitter. Such improvements, changes and modifications within the skill of the art are intended to be covered by the appended claims.

Having described the invention, the following is claimed:

1. A remote convenience system for remotely controlling convenience functions at a vehicle, said system comprising:
   receiver/controller means, located at the vehicle, for receiving vehicle remote convenience function request signals conveying remote function request messages and for controlling vehicle systems to perform the remotely requested vehicle functions, said receiver/controller means including means for providing a signal to activate an at-vehicle alarm component and means for providing a signal to activate a remote assistance-summoning component; and
   portable transmitter means for outputting remote convenience function request signals to cause remote control performance, said transmitter means including a manually actuatable emergency switch, said switch being actuatable in a first operation mode to cause activation of the at-vehicle alarm component, and being actuatable in a second, different operation mode to cause activation of the remote assistance-summoning component.

2. A system as set forth in claim 1, wherein said first mode of actuation of said switch is a single actuation, and said second mode of actuation is a plurality of actuations.

3. A system as set forth in claim 2, wherein said receiver/controller means includes means for counting received messages indiciative of switch actuations.

4. A system as set forth in claim 2, wherein said second mode of actuation is a predetermined number of actuations within a predetermined time period.

5. A system as set forth in claim 4, wherein said receiver/controller means includes means for monitoring time of received messages indicative of switch actuat ions.

6. A system as set forth in claim 1, wherein the at-vehicle alarm component includes a lights control, said remote assistance-summoning component includes a cellular phone control, said means for providing signals of said receiver/controller means includes means for providing signals to the lights control and the cellular phone control.

7. A remote convenience system for remotely controlling convenience functions at a vehicle, said system comprising:

vehicle-based receiver means, located at the vehicle, for receiving vehicle remote convenience function request signals and for conveying remote function request messages for use in controlling vehicle systems to perform the remotely requested vehicle functions; and portable transmitter means for outputting remote convenience function request signals to cause remote control performance;

said transmitter means including a manually actuatable emergency switch, said switch being actuatable in first and second different operation modes to cause output of remote convenience function request signals from said transmitter means;

said receiver means including means for conveying a signal to activate an at-vehicle alarm component in response to the first operation mode of said switch, and means for conveying a signal to activate a remote assistance-summoning component in response to the second operation mode of said switch.

8. A method of remotely controlling convenience functions at a vehicle, said method comprising:

outputting remote convenience function request signals to cause remote control performance at the vehicle;

receiving the remote convenience function request signals at the vehicle; and conveying remote function request messages for use in controlling vehicle systems to perform the remotely requested vehicle functions;

said step of outputting remote convenience function request signals including manually actuating an emergency switch in a first operation mode to cause output of a remote convenience function request signal conveying an at-vehicle alarm request;

said step of conveying including conveying a signal to activate an at-vehicle alarm component in response to the first operation mode of the switch;

said step of outputting remote convenience function request signals including manually actuating the emergency switch in a second, different operation mode to cause output of a remote convenience function request signal conveying a remote assistance-summoning request;

said step of conveying including conveying a signal to activate a remote assistance-summoning component in response to the second operation mode of the switch.

* * * * *